United States Patent
Tschiene

(10) Patent No.: US 10,836,370 B2
(45) Date of Patent: Nov. 17, 2020

(54) DEVICE FOR CONTROLLING A SAFETY-RELEVANT PROCESS, METHOD FOR TESTING THE FUNCTIONALITY OF THE DEVICE, AND MOTOR VEHICLE WITH THE DEVICE

(71) Applicant: VOLKSWAGEN AG, Wolfsburg (DE)

(72) Inventor: Alexander Tschiene, Braunschweig (DE)

(73) Assignee: VOLKSWAGEN AG, Wolfsburg (DE)

( * ) Notice: Subject to any disclaimer, the term of this patent is extended or adjusted under 35 U.S.C. 154(b) by 352 days.

(21) Appl. No.: 15/940,433

(22) Filed: Mar. 29, 2018

(65) Prior Publication Data

US 2018/0290642 A1    Oct. 11, 2018

(30) Foreign Application Priority Data

Apr. 7, 2017   (DE) .......................... 10 2017 206 035
Jun. 8, 2017    (DE) .......................... 10 2017 209 721

(51) Int. Cl.
*G06F 7/70*     (2006.01)
*G06G 7/00*     (2006.01)
(Continued)

(52) U.S. Cl.
CPC .............. *B60T 17/221* (2013.01); *B60T 7/12* (2013.01); *B60T 8/171* (2013.01); *B60T 8/32* (2013.01);
(Continued)

(58) Field of Classification Search
CPC .......... B60T 17/221; B60T 7/12; B60T 8/171; B60T 8/32; B60T 8/885; B60T 8/321;
(Continued)

(56) References Cited

U.S. PATENT DOCUMENTS

| 6,704,628 B1* | 3/2004 | Fennel ................ G06F 11/0757 |
| | | 180/404 |
| 2003/0105537 A1* | 6/2003 | Crispin ................ F02D 41/221 |
| | | 700/20 |

(Continued)

FOREIGN PATENT DOCUMENTS

| DE | 19743463 A1 | 4/1999 |
| DE | 10065118 A1 | 7/2002 |

(Continued)

OTHER PUBLICATIONS

Search Report for German Patent Application No. 10 2017 209 721.3; dated Nov. 7, 2017.

*Primary Examiner* — Mahmoud S Ismail
(74) *Attorney, Agent, or Firm* — Barnes & Thornburg LLP

(57) ABSTRACT

A device for control of a safety-relevant process. For automated driving, safety precautions are necessary. The brake system is a redundant design including primary and secondary brake systems. Both brake systems safely decelerate the transportation vehicle and take over the function of the other brake system. The control of the safety-relevant process is based on the analysis of the signals of at least one sensor. A hardware architecture and a test mode for the hardware architecture are provided. A communications bus enables exchange of data between the primary and secondary control units. The at least one sensor of the hardware architecture connects to the primary control unit and to the secondary control unit, wherein a respective sensor arrangement isolation circuit is associated with the primary control unit and the secondary control unit, which isolates the associated primary or secondary control unit from the at least one sensor.

23 Claims, 3 Drawing Sheets

(51) Int. Cl.
*G06G 7/76* (2006.01)
*B60T 7/12* (2006.01)
*B60T 17/22* (2006.01)
*B60T 8/88* (2006.01)
*B60T 8/171* (2006.01)
*B60T 8/32* (2006.01)
*G05D 1/00* (2006.01)
*G06F 7/00* (2006.01)
*G06F 17/00* (2019.01)
*G01M 17/00* (2006.01)
*G05B 11/01* (2006.01)

(52) U.S. Cl.
CPC ............... *B60T 8/885* (2013.01); *B60T 8/321* (2013.01); *B60T 2270/402* (2013.01); *B60T 2270/403* (2013.01); *B60T 2270/406* (2013.01); *B60T 2270/413* (2013.01)

(58) Field of Classification Search
CPC ......... B60T 2270/402; B60T 2270/406; B60T 2270/413; G01M 17/00; G05B 19/18
USPC ............................... 701/70, 76, 33.7; 700/20
See application file for complete search history.

(56) References Cited

U.S. PATENT DOCUMENTS

2016/0114779 A1\* 4/2016 Binder .................... B60T 8/885
 701/76
2018/0281805 A1\* 10/2018 Dudar .................. B60K 5/1283

FOREIGN PATENT DOCUMENTS

| DE | 102011084534 A1 | 4/2012 |
| DE | 102015110965 A1 | 1/2016 |
| DE | 102014221901 A1 | 4/2016 |
| DE | 102015209565 A1 | 12/2016 |
| EP | 1219489 A2 | 7/2002 |

\* cited by examiner

DEVICE FOR CONTROLLING A SAFETY-RELEVANT PROCESS, METHOD FOR TESTING THE FUNCTIONALITY OF THE DEVICE, AND MOTOR VEHICLE WITH THE DEVICE

PRIORITY CLAIM

This patent application claims priority to German Patent Application Nos. 10 2017 206 035.2, filed 7 Apr. 2017, and 10 2017 209 721.3, filed 8 Jun. 2017, the disclosures of which are incorporated herein by reference in their entirety.

SUMMARY

Autonomous driving (sometimes also called automatic driving, automated driving or piloted driving) is understood to be the locomotion of transportation vehicles, mobile robots and driverless transport systems that behave substantially autonomously. There are different levels of the term autonomous driving. In this case certain levels of autonomous driving are referred to if there is still a driver in the transportation vehicle that may only be carrying out monitoring of the automatic driving process. In Europe, the different traffic ministries (in Germany the Federal Highway Research Institute was involved) have worked together and defined the following levels of autonomy.

Level 0: "Driver only", the driver himself is driving, steering, accelerating, braking etc.

Level 1: Certain assistance systems help to operate the transportation vehicle (inter alia a distance control system—Automatic Cruise Control ACC).

Level 2: Partial automation. Inter alia automatic parking, lane keeping function, general longitudinal control, accelerating, decelerating etc. are carried out by the assistance systems (inter alia a traffic jam assistant).

Level 3: High automation. The driver does not have to monitor the system continuously. The transportation vehicle carries out functions autonomously such as triggering the indicators, lane changing and lane keeping. The driver can give attention to other things, but if necessary will be required by the system to take over control within a pre-warning time. The form of autonomy is technically feasible on freeways. The legislators are working towards allowing Level 3 transportation vehicles. The legal framework for this has already been created.

Level 4: Full automation. The control of the transportation vehicle is continuously carried out by the system. If the driving tasks are no longer being managed by the system, the driver can be required to carry out control.

Level 5: No driver necessary. Apart from the specification of the destination and starting the system, no human intervention is necessary.

Automated driving functions from level 3 absolve the driver of the responsibility for the control of the transportation vehicle. A braking and stabilizing system that is participating therein, which can fail owing to a single fault, therefore needs a suitable fallback level to always be able to keep the transportation vehicle in a safe driving dynamics state until the driver can intervene again. The brake systems for transportation vehicles of this type, which provide automated driving from level 3, are always designed redundantly. The braking systems consist of two components, namely a primary brake system and a secondary brake system, so that a component can fail without endangering driving stability.

For safety reasons, driving functions in the speed range from approx. 60 km/h require the guaranteed availability of traction control functions, such as, for example, the anti-lock brake system ABS, in addition to the guaranteed availability of deceleration. The traction control functions require sensor data as control variables. This also includes detection of the wheel revolution rates, such as is currently carried out by control units for transportation vehicle dynamics control (Electronic Stability Control ESC). If the ESC electronics (primary brake system) fail, there is no longer wheel-specific motion information available to the driving function and the traction control function in the secondary brake system, so that control at the fallback level is no longer possible.

Because of the electrical interface of the standard wheel revolution rate sensors, it is not easily possible to connect a sensor to two control units to be able to supply both control units with the required information. The sensor transmits the signals thereof by a transmission protocol that provides defined current levels. A VDA protocol is used for this purpose. In the case of a parallel circuit with two control units, the current would be divided, and the detection of the level would sometimes not be successful in either of the two control units. It would be different if the individual wheel revolution rate sensors were connected to a data bus, for example, a CAN bus (Controller Area Network), via which the data could be transmitted to a plurality of connected control units.

BRIEF DESCRIPTION OF THE DRAWINGS

An exemplary embodiment is represented in the drawings and is described in detail below using the figures, in which.

DETAILED DESCRIPTION

Figure 1:
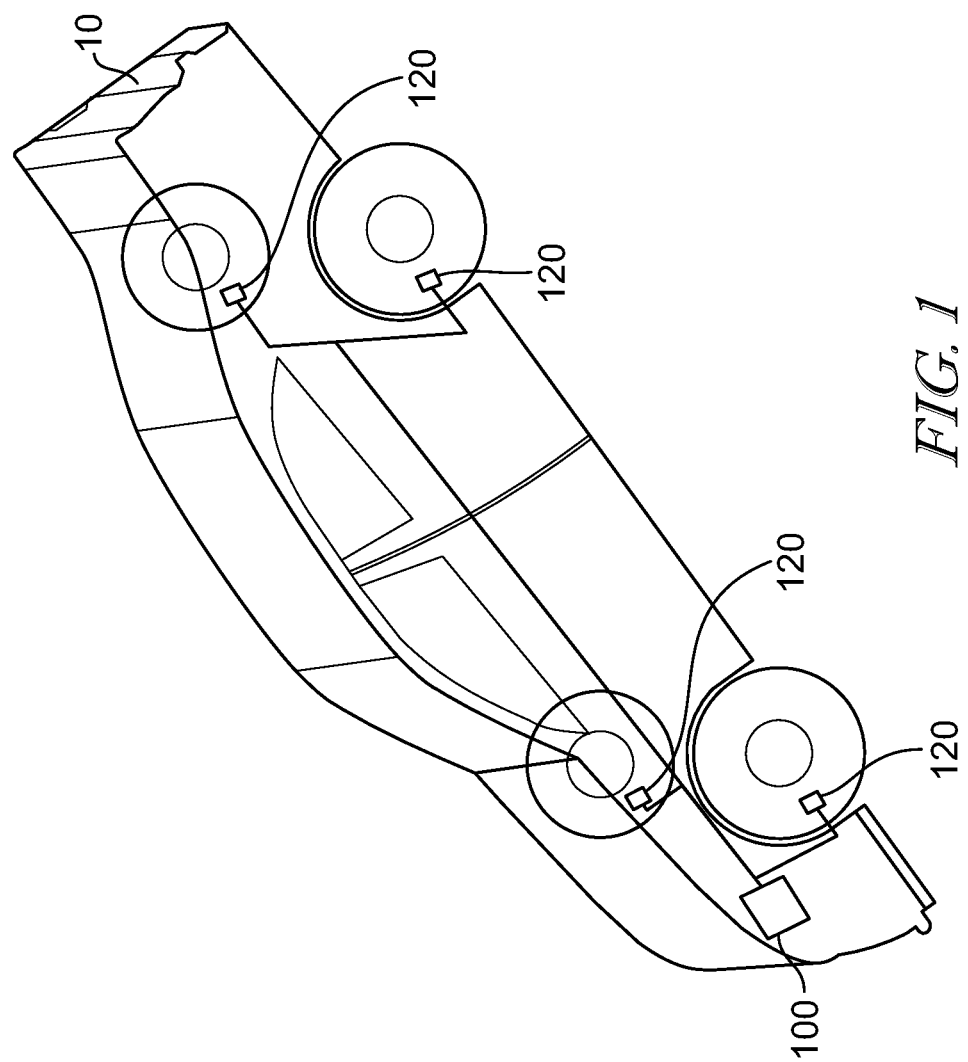
FIG. 1 shows a motorized transportation vehicle with 4 wheel revolution rate sensors.

The following known solutions are mentioned:

a) The use of 4 additional wheel revolution rate sensors, so that in total 8 wheel revolution rate sensors are used. A wheel revolution rate sensor per wheel and control unit is thus used.

b) The use of 4 redundant wheel revolution rate sensors. In this case, the component for a wheel revolution rate sensor 2 contains sensor elements with separate outputs, one for each connected control unit. Depending on which control unit is controlling the braking process, the matching sensor element is thus analyzed. Both sensor elements are always in operation at the same time.

From DE 102015110965 A1, a device is known that is provided for safe deceleration of an autonomously controlled transportation vehicle. The device is of a redundant design. It contains a first brake control module, also known as the primary module, and a second brake control module, also known as the secondary module. All wheel revolution rate sensors are connected to the first brake control module in a first exemplary embodiment. The first brake control module provides the wheel revolution rate data of the wheel revolution rate sensors to the second brake control module via a data connection. In a second exemplary embodiment, the majority of wheel revolution rate sensors are connected to the first brake control module and only a smaller number of wheel revolution rate sensors are connected to the second brake control module.

From DE 102015209565 A1, a system is known that is also provided for safe deceleration of an autonomously controlled transportation vehicle. This also has a primary brake system and a secondary brake system. A first control unit is associated with the primary brake system (for example, an ESP/ABS control unit). The control unit is also of a redundant design. It consists of a first control device and a second control device embodied as an ASIC. The wheel revolution rate sensors can be supplied with voltage by both control devices. The wheel revolution rate data are detected by the second control device and can be forwarded via a transportation vehicle bus (for example, a CAN bus) to an external control unit, which carries out control for the secondary brake system. Even in the event of failure of the first control device and the microcontroller of the first control unit, the wheel revolution rate data can still be forwarded to the external control unit.

From EP1219489A2, a system for controlling and/or monitoring a control unit network comprising at least two control units is known. The first control unit has a plurality of functions, namely carrying out the own control function thereof, monitoring the own control function thereof and monitoring the second control unit. If the first control unit detects a malfunction of the second control unit, it switches the second control unit off.

The known solutions have some drawbacks. For 4 additional wheel revolution rate sensors or even 4 redundant wheel revolution rate sensors, twice as many lines than previously must be provided in the on-board electrical system. The costs of the standard sensors are increased, because twice as many are required. Redundant sensors have a smaller volume of items, and it is to be expected that the costs for this are even higher.

The solutions according to the mentioned published patent applications have the same aim, but they describe a circuit that is only used in one of the two control units. This has a number of drawbacks:

Twice as many plug contacts are necessary on the control unit that contains the circuit for the wheel revolution rate sensors (for example, 16 instead of 8 plug contacts).

When changing over to the secondary control unit in the event of a failure of the voltage supply in the primary control unit, sometimes a loss of voltage in the changeover logic must be accepted, because a self-conducting MOSFET must be used.

Within the scope of the disclosure, it has been recognized that the solutions provided do not utilize the wheel revolution rate sensors efficiently, and in this respect the costs for additional wheel revolution rate sensors are high.

According to the present disclosure, a hardware architecture is proposed. This contains a standardisable hardware interface for the connection of 4 standard wheel revolution rate sensors to two control units. According to the disclosure, for the hardware architecture a behavior model for the operating mode is also proposed, which ensures that also following the occurrence of a single fault in one of the two control units the data of all sensors can be directly received by the other control unit. In this case, the data are transmitted via the transportation vehicle bus to the other control unit and also made available to further receivers. Thus, fallback levels can be implemented in both control units, which can always rely on the existence of wheel revolution rate information. Furthermore, a test mode is proposed that is used to check the full operability of the system. It is thus ensured that the system satisfies the redundancy requirements of the driving function.

A benefit of the standardisable hardware interface is that the hardware can be implemented identically in all control units.

In principle, conventional circuits that contain the sensor interfaces are used in the control units. However, a sensor arrangement isolation circuit is still inserted in the control unit between the IC and the sensors, which can break the connection between the sensors and the defective control unit, so that no current can flow across the interface. As a result, a wheel revolution rate sensor can be connected in parallel to two control units, since it is ensured by the sensor arrangement isolation circuit that one of the two control units breaks the interface and the sensor current is thus not split.

Each control unit must control the isolation circuit and can communicate the respective state via the transportation vehicle bus. A failure of a control unit must result in any case in the circuit breaking the connection of the control unit to the sensors. This can, for example, be achieved using an already existing monitoring circuit (watchdog). The watchdog function is already present in current brake systems and stops the control unit once it has been detected that the actuation arrangement or electronics can no longer be controlled and there is thus a risk of destabilization of the transportation vehicle. If the control unit has not yet failed completely, the status of the interface can still be communicated via the transportation vehicle bus.

It is beneficial for this if the sensor arrangement isolation circuit contains an AND circuit that brings about a connection of the at least one sensor to the respective primary or secondary control unit if a signal arrives from the monitoring device that signals that the respective control unit is working faultlessly and the respective control unit is signaled by a microcontroller that the respective control unit is in a state in which there is processing and/or forwarding of the signals of the at least one sensor to the respective secondary or primary control unit.

In this case, the software of the control units must be designed to always only activate the interface if it is ensured that the interface of the other control unit is deactivated. This is carried out by an internal state machine that receives the states of the respective other state machine via the transportation vehicle bus. The software of the primary brake system must activate the interface in a standard manner and only deactivate it on the occurrence of certain faults. The software of the secondary brake system must deactivate the interface in a standard manner and must immediately activate it if a fault in the primary brake system has caused the own interface thereof to be deactivated.

According to the disclosed embodiments, in addition a test mode is proposed that enables checking of the ability to change the interfaces over. It is thus ensured that the required redundancy of the brake system is present before an automated driving function can be activated by the driver. The test mode runs as follows:

The primary control unit breaks the connection to the at least one sensor using the sensor arrangement isolation circuit associated therewith. It signals entry to the test mode to the secondary control unit via the communications bus, wherein the secondary control unit then makes a connection of the at least one sensor to the secondary control unit using the sensor arrangement isolation circuit associated therewith and sends the sensor data to the primary control unit via the communications bus. The primary control unit checks the correct reception of the sensor data, and in the event of a positive result of the check the primary control unit signals the end of the test mode via the communications bus.

It is beneficial if the secondary control unit switches off the at least one sensor after entry of the information regarding the end of the test mode via the sensor arrangement isolation circuit associated therewith, whereupon for its part the primary control unit makes a connection of the at least one sensor to the primary control unit by the sensor arrangement isolation circuit associated therewith because of the lack of transmitted sensor data, and continues the supply of sensor data to the secondary control unit as before the initiation of the test mode.

It is beneficial if the test of the operability of the device is carried out following a request to initiate the operating mode of highly automated driving of the motorized transportation vehicle. The test is then carried out before the transportation vehicle changes to the highly automated driving mode.

Furthermore, it is beneficial for the test mode if, in the case in which the primary control unit detects during the test that the sensor data cannot be correctly received by the secondary control unit, a connection of the at least one sensor to the primary control unit is made by the sensor arrangement isolation circuit associated therewith and, as previously, before the initiation of the test mode, continues the supply of sensor data to the secondary control unit. During this it is beneficial if the primary control unit signals the incorrect reception of the sensor data to the secondary control unit and the secondary control unit thereupon switches off the at least one sensor by the associated sensor arrangement isolation circuit.

Accordingly, it is beneficial if, in the case in which the secondary control unit detects during the test that the sensor data cannot be correctly received by the primary control unit, the at least one sensor is connected to the secondary control unit by the sensor arrangement isolation circuit associated therewith and the supply of sensor data to the primary control unit is carried out, wherein the secondary control unit signals the incorrect reception of the sensor data to the primary control unit and the primary control unit thereupon switches off the at least one sensor by the associated sensor arrangement isolation circuit.

The disclosed embodiments can be used in all transportation vehicles with an automated driving function from level 3 (according to the VDA), which operate in the higher speed range. At low speeds (for example, below 60 km/h), no wheel revolution rate sensor data are necessary to be able to decelerate the transportation vehicle in a stable manner.

The present description illustrates the principles of the disclosure. It is thus understood that persons skilled in the art are able to conceive of different arrangements that are not explicitly described here, but that embody principles according to the disclosure and that are also to be protected within the scope thereof.

FIG. 1 shows a motorized transportation vehicle. A passenger transportation vehicle Pkw is represented. However, any other transportation vehicles could also be considered as the transportation vehicle. Examples of other transportation vehicles are: utility transportation vehicles, in particular, trucks Lkw, agricultural machines, building machinery, motor cycles, rail transportation vehicles, etc. The transportation vehicle is provided with reference number 10. As a Pkw, the transportation vehicle is fitted with 4 wheels. Present-day brake systems are usually also fitted with anti-slip regulation ASR. For this it is necessary to detect the wheel revolution rates of all 4 wheels, likewise for the anti-lock brake function ABS. Therefore, it is also shown in the drawing that a wheel revolution rate sensor 120 is mounted on each wheel. The wheel revolution rate sensors 120 are connected to a brake control system 100. The brake control system 100 consists of two control units that operate mutually independently. For the primary brake system, for example, an ESC control unit is provided that controls the primary brake system. This carries out the function of electronic ride stabilization, also known as Electronic Stability Control (ESC). The ESC control unit has the capability to decelerate the transportation vehicle 10 from higher speeds in a controlled manner. For this, in modern ESC control units the functionality of the antilock brake system ABS is also present. Independently of the primary brake system, there is however also a secondary brake system that can also decelerate the transportation vehicle in a controlled manner. For example, an intelligent brake booster has been developed for this, which is referred to as an electrical brake booster (eBKV). The control unit thereof then forms the control unit of the secondary brake system.

The two control units do not have to be installed at the same location, as shown in FIG. 1, but they can also be installed at different locations in the motorized transportation vehicle 10. They are in any case connected to each other via the transportation vehicle bus. As an example of a transportation vehicle bus that is used to network control units in the motorized transportation vehicle, the Controller Area Network CAN is mentioned. The bus system is standardized and we refer to the corresponding specifications according to the ISO 11898 standard for further details. Because different versions of the CAN bus can be used for different categories of control unit, here the CAN drive bus is mentioned that is used to network control units of the drive train such as the engine control unit, brake control unit, gearbox control unit and ESC control unit. The high-speed version of the CAN bus according to the ISO 11898-2 specification is mainly used for this purpose.

Figure 2:
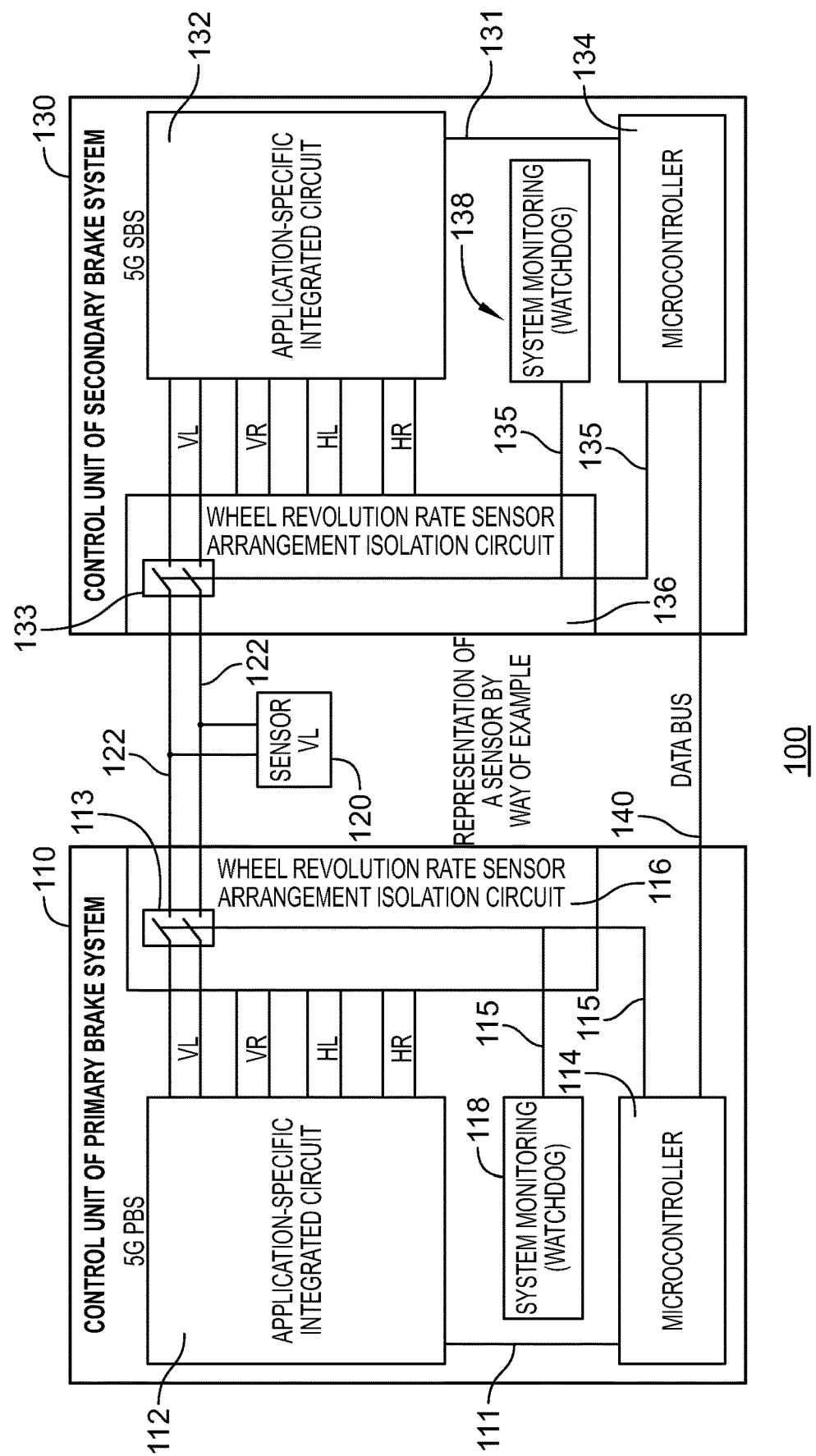
FIG. 2 shows a hardware architecture of a brake system for highly automated driving with a primary control unit and a secondary control unit.

FIG. 2 now shows the hardware architecture of the brake control system 100. The disclosed embodiment contains a standardisable hardware interface for the connection of 4 standard wheel revolution rate sensors to two control units and a behavior model, which ensures that even after the occurrence of a single fault one of the two control units can receive the data of all the sensors directly and can provide the data via the transportation vehicle bus to the other control unit and further receivers. Thus, both control units can implement fallback levels, which can always rely on the existence of wheel revolution rate information.

The control unit of the primary brake system is denoted by reference number 110. As described above, it is the ESP/ABS control unit. The control unit of the secondary brake system is denoted by reference number 130. It is the control unit of the electronic brake booster. The 4 wheel revolution rate sensors are denoted by the reference number 120. The signal lines of the wheel revolution rate sensors 120 are denoted by reference number 122. The two control units 110 and 130 are networked together by a transportation vehicle data bus 140, abbreviated to transportation vehicle bus, via which data can be exchanged. Further control units can be connected to the transportation vehicle bus 140, such as the engine control unit and the gearbox control unit (not shown in the drawing). The architecture of the control units is also represented in FIG. 2. Typically, the control units 110 and 130 each contain an application-specific circuit ASIC 112 and 132, which is responsible for the current/voltage supply of the wheel revolution rate sensors 120 and for the detection and processing of the signals of the wheel revolution rate sensors 120. The control units 110 and 130 are furthermore each fitted with a microcontroller 114 and 134. The control unit carries out the actual control functions. In addition, a monitoring circuit 118 and 138 is provided in each control unit. Such monitoring circuits are known by the term "watchdog" circuit. With these the correct program execution in the control unit is monitored. Connections 111 and 131 between the application-specific circuits 112 and 132 and the microcontrollers 114 and 134 are provided to be able to transmit the detected sensor data, for example.

As mentioned, the wheel revolution rate sensors 120 are connected to both control units 110, 130. In principle, conventional circuits are used in the control units, which relate to the sensor interfaces. Between the respective ASIC 112, 132 and the wheel revolution rate sensors 120, however, yet another sensor arrangement isolation circuit 113, 133 is inserted in the respective control unit 110, 130, which can break the connection between the wheel revolution rate sensors 120 and the respective control unit 110, 130, so that current can no longer flow across the interface. Thus, a wheel revolution rate sensor 120 can be connected in parallel to two control units 110, 130, since it is ensured that one of the two control units 110, 130 breaks the connection and the sensor current is thus not split.

Each control unit 110, 130 must be able to control the sensor arrangement isolation circuit 113, 133 and communicate the respective state via the transportation vehicle bus 140. A failure of a control unit must in any case result in the sensor arrangement isolation circuit breaking the connection of the control unit 110, 130 to the wheel revolution rate sensors 120. This is achieved with the mentioned watchdog circuit. A watchdog circuit consists essentially of a counter that is reset at defined positions in the program execution. If this does not occur because of a fault, for example, because the program enters an endless loop, counter overflow occurs and the watchdog circuit disables the control unit. The watchdog function in the current brake systems disables the control unit once it has been detected that the actuation arrangement or electronics can no longer be controlled and hence a destabilization of the transportation vehicle is impending. If the control unit has not failed completely, the status of the interface can still be communicated via the transportation vehicle bus 140. An alternative procedure with the use of watchdog circuits is that the control unit is reset in the event of a fault to test whether the fault can be eliminated as a result.

The software of the control units 110, 130 is designed so that it only ever activates the sensor interface if it is ensured that the sensor interface of the other control unit 130, 110 is deactivated. This is carried out by an internal state machine, which receives the state of the respective other state machine via the transportation vehicle bus 140. The software of the control unit 110 of the primary brake system activates the sensor interface thereof in a standard manner and the sensor interface is only deactivated on the occurrence of a defined fault. The software of the control unit 130 of the secondary brake system deactivates the sensor interface thereof in a standard manner and immediately activates the sensor interface if a fault in the primary brake system has resulted in the sensor interface thereof being deactivated.

For the system environment it is necessary to comply with the following points because of the safety requirements:
Redundant power supply
Each control unit 110, 130 is supplied with power from an independent voltage source.

Redundant communications
Each control unit 110, 130 can communicate via two mutually independent communications paths with the respective other control unit 130, 110 and certain further control units in the transportation vehicle.
Fault-tolerant driving function
The failure of a wheel revolution rate sensor 120 does not cause failure of the driving function. Safe control of the transportation vehicle is also possible with 3 wheel revolution rate sensors 120.

In addition, a test mode is provided that enables the capability of the control units 110, 130 to changeover the sensor interfaces to be tested. It is thus ensured that the required redundancy of the brake system is provided before an automated driving function is activated by the driver.

Figure 3:
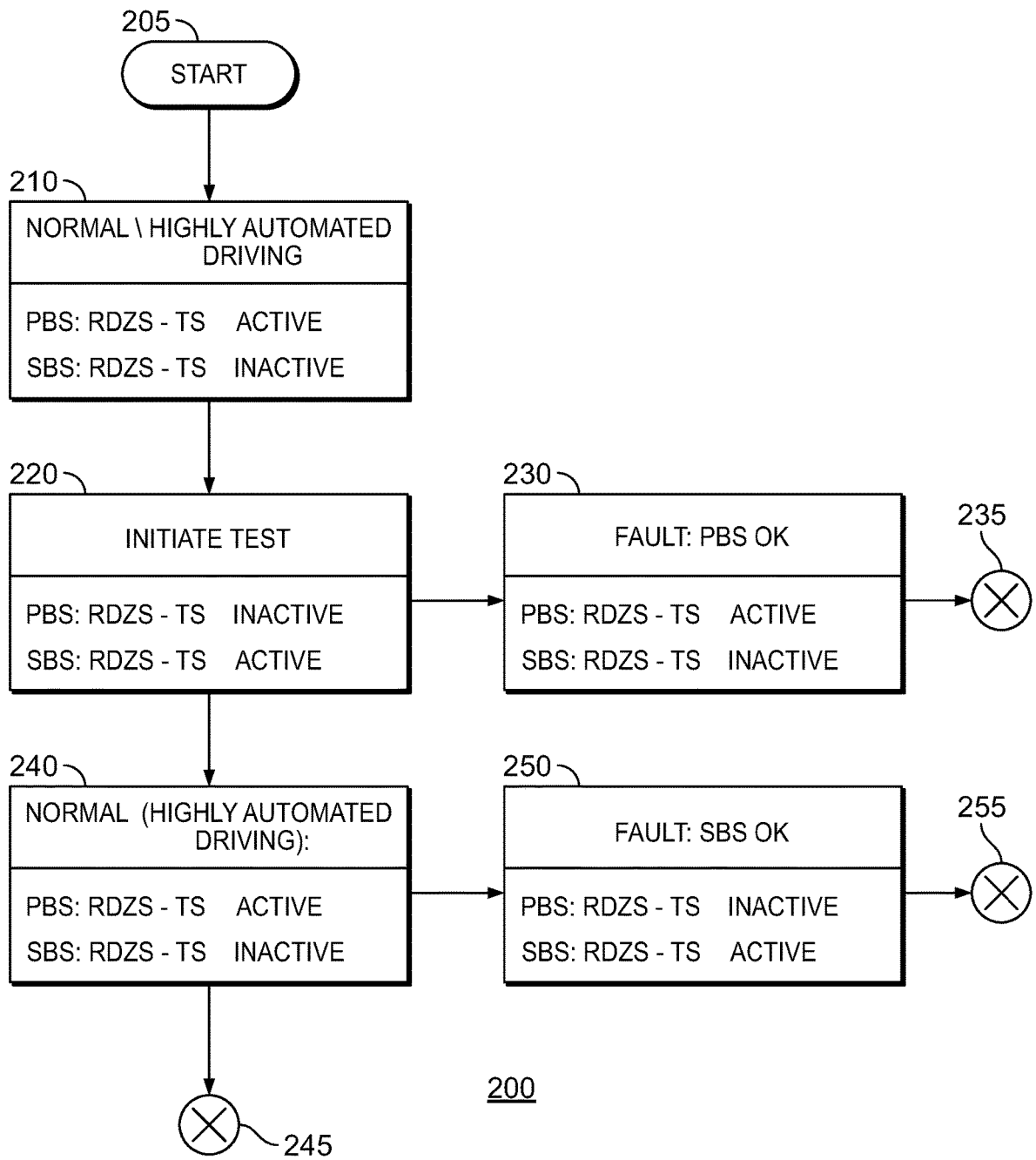
FIG. 3 shows a state diagram for the brake system with a test mode.

FIG. 3 shows a state diagram for the brake system with a test mode. Following the transportation vehicle start in the operation at 205, the software first changes to the state 210 "normal mode\HAF". In the mode, no highly automated driving HAF occurs. The control unit 110 of the primary brake system PBS makes the connection to the wheel revolution rate sensors 120 by the switching units 113 in the sensor arrangement isolation circuit 116. The sensor signals are sent from the primary brake system via the CAN bus 140. The control unit 130 of the secondary brake system SBS breaks the connection between the wheel revolution rate sensors 120 and the control unit 130 of the secondary brake system by the switching units 133 in the sensor arrangement isolation circuit 136. The control unit 130 of the secondary brake system receives the sensor signals via the CAN bus 140.

The system remains in the state 210 until the highly automated driving function is requested by the driver via the corresponding user interface. For this purpose, a HAF request is issued by the main function to the control unit 110 of the primary brake system. The system then changes to the state 220 "Init (Test)", in which initialization of the test mode takes place. The test mode proceeds as follows: The control unit 110 of the primary brake system deactivates the sensor interface thereof and signals entry into in the test mode to the control unit 130 of the secondary brake system via the transportation vehicle bus 140. In the test mode state, the control unit 110 of the primary brake system sends no wheel revolution rate sensor data 120 to the control unit 130 of the SBS. The control unit 130 of the secondary brake system receives the signal about the entry into the test mode and makes the connection to the wheel revolution rate sensors 120 with the switching units 133 of the sensor arrangement isolation circuit 136. In addition, it starts to send the analyzed data of the wheel revolution rate sensors 120 via the transportation vehicle bus 140 to the control unit 110 of the primary control unit. The control unit 110 receives the data of the wheel revolution rate sensors 120 via the CAN bus. Via the transportation vehicle bus 140, the initiation of the test mode is also signaled back to the control unit 110 of the primary control unit. The control unit 110 of the primary brake system checks the received data and signals the end of the test mode to the control unit 130 of the SBS in the event of a positive result. In an alternative exemplary embodiment, the design can also be such that the change to the state 220 Init (Test) already occurs before the HAF request by the driver to reduce the reaction time relative to the driver. A repeating, cyclical check would also be possible. However, the disclosed embodiments can also be used for "fully automatic driving" from VDA level 5, which is carried out without a driver.

The control unit 130 of the secondary brake system receives the signal, changes into the state 240 "normal mode (HAF ready)" and in the mode breaks the connection to the wheel revolution rate sensors 120. The control unit 110 of the primary brake system now no longer receives sensor data via the transportation vehicle bus 140 and thereupon, in the state 240 "normal mode (HAF ready)", makes the connection to the wheel revolution rate sensors 120. For its part, it sends the data of the wheel revolution rate sensors 120 via the transportation vehicle bus 140 to the control unit 130 of the secondary brake system. If the data of the wheel revolution rate sensors 120 are received correctly, the primary brake system is initialized ready and also changes into the state 240 "Normal (HAF)". In the state it is ready for the automated driving function. The control unit 130 of the secondary brake system receives the sensor data via the transportation vehicle bus 140 from now and is also initialized. HAF readiness is signaled back to the transportation vehicle main function, from which the request for the initiation of the HAF mode came. The automated driving function is then initiated as intended by the driver. The state is then maintained until the end of the driving cycle in the operation at 245, if no fault occurs.

In the state 220 "Init (Test)", the data received by the control unit 130 of the secondary brake system are checked. If the data are no longer being received correctly, a change into the state 230 "fault: PBS ok" is carried out. The fault case is thus intercepted by a change into the safe state of the primary brake system. In the state, the control unit 110 of the primary brake system is connected to the wheel revolution rate sensors 120 and the data of the wheel revolution rate sensors are sent via the transportation vehicle bus 140 to the control unit 130 of the secondary brake system. The control unit 130 of the secondary brake system tests the input of the data from the wheel revolution rate sensors. If the date are no longer being received correctly, there is a serious fault for which there is no remedy. The test is ended in the operation at 235 with a corresponding result. An automated driving function cannot be initiated.

In the state 240 "Normal (HAF)" the data that are received from the control unit 110 of the primary brake system are checked continuously. If the data are no longer received correctly, a change to the state 250 "fault: SBS ok" is carried out. The fault case is thus intercepted by a change to the safe state of the secondary brake system. In the state, the control unit 130 of the secondary brake system is then connected to the wheel revolution rate sensors 120 and the data of the wheel revolution rate sensors 120 are sent via the transportation vehicle bus 140 to the control unit 110 of the primary brake system. The control unit 110 of the primary brake system tests the input of the data from the wheel revolution rate sensors 120. If the data are also no longer being received correctly, there is a serious fault for which there is no remedy. The test is ended in the operation at 255 with a corresponding result. An automated driving function cannot be initiated.

All the examples mentioned herein as well as dependent formulations are to be understood as being without limitation to such specific examples. Thus, for example, persons skilled in the art will recognize that the block diagram shown here represents a conceptual view of an example of a circuit. Similarly, it can be seen that a represented flow chart, state transition diagram, pseudocode and similar constitute different versions for the illustration of processes that are essentially stored in computer-readable media and thus can be executed by a computer or processor.

It is to be understood that the proposed method and the associated devices can be implemented in different forms of hardware, software, firmware, special processors or a combination thereof. Special processors can comprise application-specific integrated circuits (ASICs), Reduced Instruction Set Computers (RISC) and/or Field Programmable Gate Arrays (FPGAs). The proposed method and the device may be implemented as a combination of hardware and software. The software may be installed as an application program on a program memory device. This is typically a machine based on a computer platform comprising hardware, such as, for example, one or more central processor units (CPU), a direct access memory (RAM) and one or more input/output (I/O) interfaces. Typically, moreover, an operating system is installed on the computer platform. The different processes and functions that have been described here can be part of the application program or a part that is executed by the operating system.

The disclosure is not restricted to the exemplary embodiments that are described here. There is scope for different adaptations and modifications that, because of his specialist knowledge, would be considered by the person skilled in the art as also being associated with the disclosure.

REFERENCE CHARACTER LIST

100 brake device
110 primary control unit
111 data bus secondary control unit
112 application-specific circuit primary control unit
113 switching unit
114 microcontroller
115 control line
116 sensor arrangement isolation circuit primary control unit
118 monitoring circuit
120 wheel revolution rate sensor
122 sensor signal line
130 secondary control unit
131 data bus primary control unit
132 application-specific circuit secondary control unit
133 switching unit
134 microcontroller
135 control line
136 sensor arrangement isolation circuit secondary control unit
138 monitoring circuit
140 communications bus
200 state diagram
210 state of normal mode without HAF readiness
220 state of test mode
230 state of safe mode by primary control unit
240 state of normal mode with HAF readiness
250 state of safe mode by secondary control unit

The invention claimed is:
1. A device for the control of a safety-relevant process, the device comprising:
   a primary control unit;
   a secondary control unit, wherein the primary and secondary control units are redundant to one another and the secondary control unit carries out functionality of the primary control unit in response to a fault, wherein the control of the safety-relevant process is performed based on analysis of signals generated by at least one sensor;
   a communications bus coupling the primary and secondary control units that enables exchange of data between the primary and secondary control units;
   wherein the at least one sensor is connected to the primary control unit and to the secondary control unit;

wherein the device further comprises respective sensor arrangement isolation circuits associated with each of the primary control unit and the secondary control unit, which, when activated, isolates the associated primary or secondary control unit from the at least one sensor;

wherein the safety-relevant process, during a test mode, includes:

breaking a connection between the primary control unit and the at least one sensor using the sensor arrangement isolation circuit associated therewith;

the primary control unit notifying the secondary control unit of entry into the test mode via the communications bus;

making a connection between the secondary control unit and the at least one sensor using the sensor arrangement isolation circuit associated therewith;

sending, by the secondary control unit, the sensor data via the communications bus to the primary control unit; and checking, by the primary control unit, the correct reception of the sensor data; and initiating an automated driving function in response to a positive checked result.

2. The device of claim 1 further comprising a monitoring device for monitoring the function of the primary control unit.

3. The device of claim 1 further comprising a monitoring device for monitoring the function of the secondary control unit.

4. The device of claim 2 wherein the monitoring device relates to a program execution monitoring device.

5. The device of claim 1 wherein each of the sensor arrangement isolation circuits contains an AND circuit that connects the at least one sensor to the respective primary or secondary control unit in response to both receipt of a signal from a monitoring device that signals that the respective control unit is working faultlessly, and a microcontroller of the respective control unit signaling that the respective control unit is in a state in which there is processing and/or forwarding of the signals of the at least one sensor to the respective secondary or primary control.

6. The device of claim 1 wherein the safety-relevant process is a braking process of a motorized transportation vehicle and the device is installed in a motorized transportation vehicle.

7. The device of claim 5 wherein the primary control unit is a control unit for a primary brake system of a motorized transportation vehicle.

8. The device of claim 5 wherein the secondary control unit is a control unit for a secondary brake system of a motorized transportation vehicle.

9. The device of claim 5 wherein the at least one sensor is a wheel revolution rate sensor.

10. A method for testing operability of a device for the control of a safety-relevant process, wherein the device includes a primary control unit, a secondary control unit, wherein the primary and secondary control units are redundant to one another and the secondary control unit carries out functionality of the primary control unit in response to a fault, wherein the control of the safety-relevant process is performed based on analysis of signals generated by at least one sensor, and a communications bus coupling the primary and secondary control units that enables exchange of data between the primary and secondary control units, wherein the at least one sensor is connected to the primary control unit and to the secondary control unit, and wherein the device further comprises respective sensor arrangement isolation circuits associated with each of the primary control unit and the secondary control unit, which, when activated, isolates the associated primary or secondary control unit from the at least one sensor, wherein the method comprises:

breaking a connection between the primary control unit and the at least one sensor using the sensor arrangement isolation circuit associated therewith;

the primary control unit notifying the secondary control unit of entry into the test mode via the communications bus;

making a connection between the secondary control unit and the at least one sensor using the sensor arrangement isolation circuit associated therewith;

the secondary control unit sending the sensor data via the communications bus to the primary control unit; and checking, by the primary control unit, checking the correct reception of the sensor data; and initiating an automated driving function in response to a positive checked result.

11. The method of claim 10 further comprising, signaling by the primary control unit the end of the test mode via the communications bus, following input of the information about the end of the test mode, the secondary control unit switching off the at least one sensor by the sensor arrangement isolation circuit associated therewith, whereupon because of the lack of transmitted sensor data, the primary control unit makes a connection of the at least one sensor to the primary control unit by the sensor arrangement isolation circuit associated therewith and continues the supply of sensor data to the secondary control unit as before the initiation of the test mode.

12. The method of claim 10 wherein the performance of the test of the operability of the device is carried out following a request to initiate the operating mode of highly automated driving of the motorized transportation vehicle.

13. The method of claim 10 wherein in response to the primary control unit detecting during the test that the sensor data is not correctly received by the secondary control unit, a connection of the at least one sensor to the primary control unit is made by the sensor arrangement isolation circuit associated therewith, and as previously, before the initiation of the test mode, the supply of sensor data to the secondary control unit is continued, wherein the primary control unit notifies the incorrect reception of the sensor data to the secondary control unit and the secondary control unit switches off the at least one sensor by the associated sensor arrangement isolation circuit.

14. The method of claim 10 wherein, in response to the secondary control unit detecting during the test that the sensor data is not received correctly by the primary control unit, a connection of the at least one sensor to the secondary control unit is made by the sensor arrangement isolation circuit associated therewith and the supply of sensor data to the primary control unit is carried out, wherein the secondary control unit notifies the incorrect reception of the sensor data to the primary control unit and the primary control unit thereupon switches off the at least one sensor by the associated sensor arrangement isolation circuit.

15. A motorized transportation vehicle comprising a device for control of a safety-relevant process, the device including:

a primary control unit;

a secondary control unit, wherein the primary and secondary control units are redundant to one another and the secondary control unit carries out functionality of the primary control unit in response to a fault, wherein the control of the safety-relevant process is performed based on analysis of signals generated by at least one sensor;
a communications bus coupling the primary and secondary control units that enables exchange of data between the primary and secondary control units,
wherein the at least one sensor is connected to the primary control unit and to the secondary control unit,
wherein the device further comprises respective sensor arrangement isolation circuits associated with each of the primary control unit and the secondary control unit, which, when activated, isolates the associated primary or secondary control unit from the at least one sensor; and
wherein the safety-relevant process, during a test mode, includes:
breaking a connection between the primary control unit and the at least one sensor using the sensor arrangement isolation circuit associated therewith;
the primary control unit notifying the secondary control unit of entry into the test mode via the communications bus;
making a connection between the secondary control unit and the at least one sensor using the sensor arrangement isolation circuit associated therewith;
sending, by the secondary control unit, the sensor data via the communications bus to the primary control unit; and
checking, by the primary control unit, the correct reception of the sensor data; and
initiating an automated driving function in response to a positive checked result.

16. The vehicle of claim 15 wherein the device further comprises a monitoring device for monitoring the function of the primary control unit.

17. The vehicle of claim 1 wherein the device further comprises a monitoring device for monitoring the function of the secondary control unit.

18. The vehicle of claim 15 wherein the monitoring device relates to a program execution monitoring device.

19. The vehicle of claim 15 wherein each of the sensor arrangement isolation circuits contains an AND circuit that connects the at least one sensor to the respective primary or secondary control unit in response to both receipt of a signal from a monitoring device that signals that the respective control unit is working faultlessly, and a microcontroller of the respective control unit signaling that the respective control unit is in a state in which there is processing and/or forwarding of the signals of the at least one sensor to the respective secondary or primary control.

20. The vehicle of claim 15 wherein the safety-relevant process is a braking process of a motorized transportation vehicle and the device is installed in a motorized transportation vehicle.

21. The vehicle of claim 20 wherein the primary control unit is a control unit for a primary brake system of the motorized transportation vehicle.

22. The vehicle of claim 21 wherein the secondary control unit is a control unit for a secondary brake system of the motorized transportation vehicle.

23. The vehicle of claim 15 wherein the at least one sensor is a wheel revolution rate sensor.

* * * * *